Figure 1:
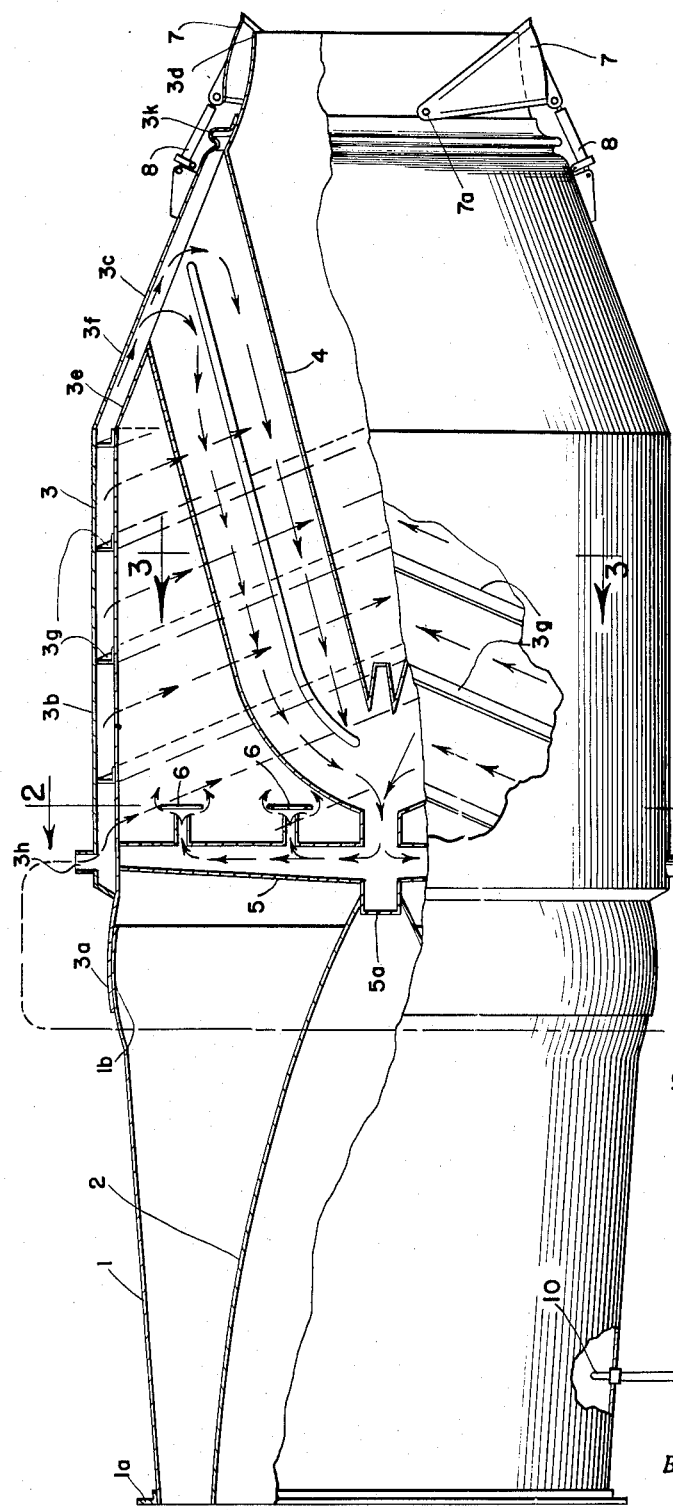
Figure 1:
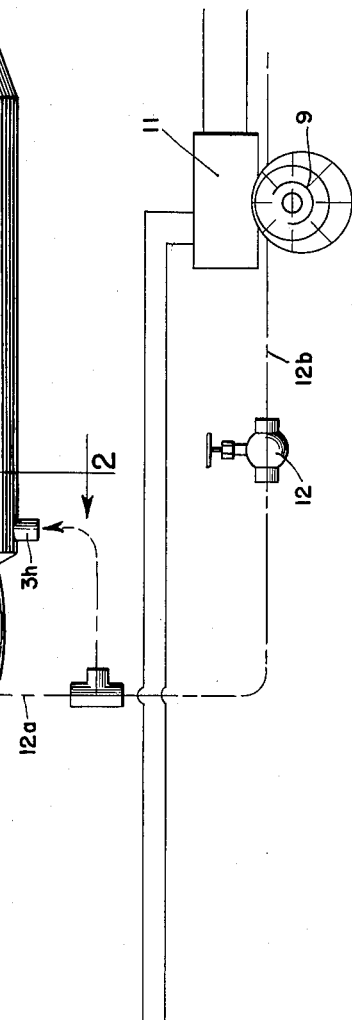

May 15, 1956  D. S. SANBORN  2,745,249
REHEATER AND FUEL VAPORIZER FOR JET PROPULSION ENGINES
Filed Oct. 22, 1946  3 Sheets-Sheet 1

INVENTOR.
DANIEL S. SANBORN
BY A.B.Bowman
ATTORNEY

May 15, 1956  D. S. SANBORN  2,745,249
REHEATER AND FUEL VAPORIZER FOR JET PROPULSION ENGINES
Filed Oct. 22, 1946  3 Sheets-Sheet 2

*INVENTOR.*
DANIEL S. SANBORN
BY
ATTORNEY

May 15, 1956 D. S. SANBORN 2,745,249
REHEATER AND FUEL VAPORIZER FOR JET PROPULSION ENGINES
Filed Oct. 22, 1946 3 Sheets-Sheet 3
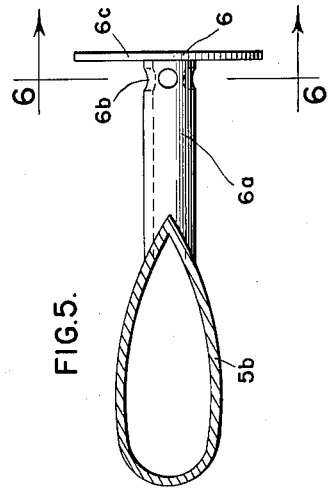
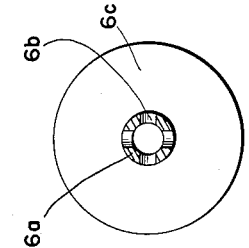
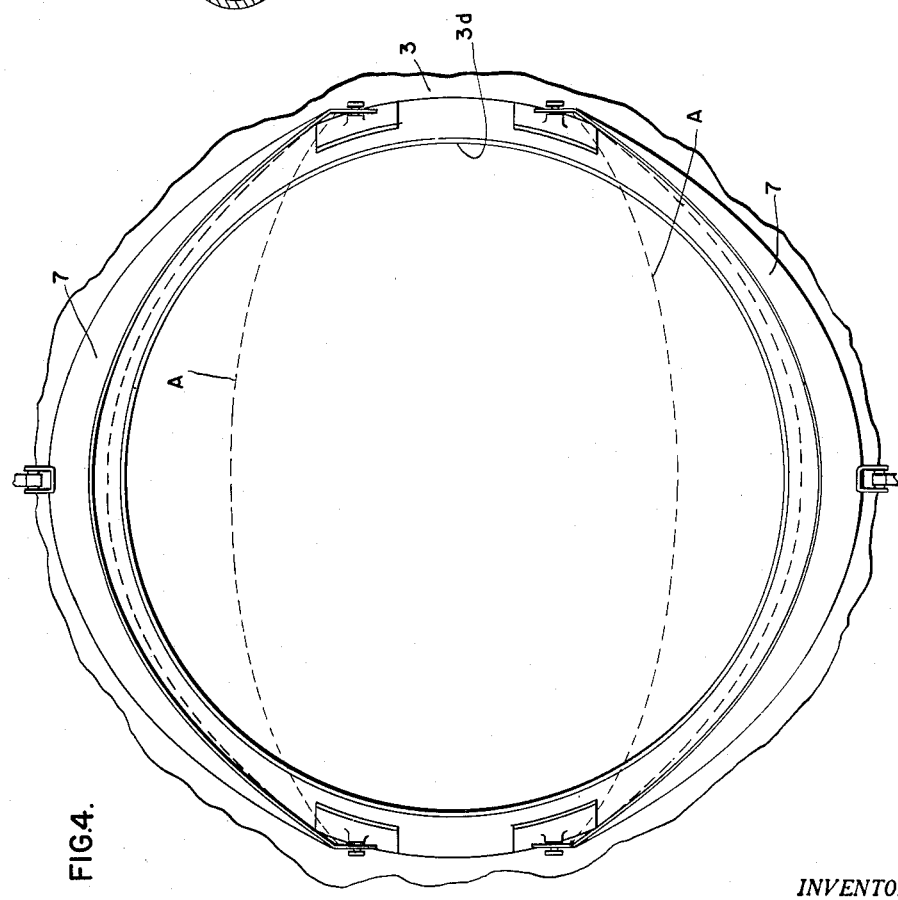
*INVENTOR.*
DANIEL S. SANBORN
BY
*A. B. Bowman*
ATTORNEY

United States Patent Office 2,745,249
Patented May 15, 1956

2,745,249

REHEATER AND FUEL VAPORIZER FOR JET PROPULSION ENGINES

Daniel S. Sanborn, Palos Verdes Estates, Calif., assignor to The Ryan Aeronautical Co., San Diego, Calif., a corporation of California Application October 22, 1946, Serial No. 704,894

4 Claims. (Cl. 60—35.6)

My invention relates to a reheater and fuel vaporizer for jet-propulsion engines and the objects of my invention are:

First, to provide a reheater of this class which increases the thrust of conventional jet-propulsion engines;

Second, to provide a reheater of this class which automatically maintains a conventional turbo jet-engine at its maximum rated out-put and corresponding exhaust temperature;

Third, to provide a reheater for jet-propulsion engines of this class in which eyelid shutters at the outlet of the reheater may be partially closed to accommodate the exhaust flow of the turbo jet-engine when the reheater is not in use;

Fourth, to provide a reheater for jet propulsion engines of this class having novel fuel vaporizing means;

Fifth, to provide a reheater of this class which is readily and easily connected to the exhaust of a conventional turbo jet-engine replacing the conventional exhaust cone thereof;

Sixth, to provide a reheater of this class which very slightly increases the weight of the jet-engine installation in proportion to the additional thrust created thereby;

Seventh, to provide a reheater for jet-propulsion engines of this class in which spheroid joint means interconnects the reheater casing with the diffuser rearwardly of the conventional turbo jet-engine, whereby the installation of the heater is greatly facilitated and vibration therein, is effectively compensated for;

Eighth, to provide a reheater for jet-propulsion engines which may be operated individually as a ram jet-engine;

Ninth, to provide a reheater for jet-propulsion engines of this class having very simple fuel vaporizing nozzle means; and Tenth, to provide a reheater for jet-propulsion engines of this class which is very simple and economical of construction, efficient in its action, and which will not readily deteriorate or get out of order.

Figure 3:
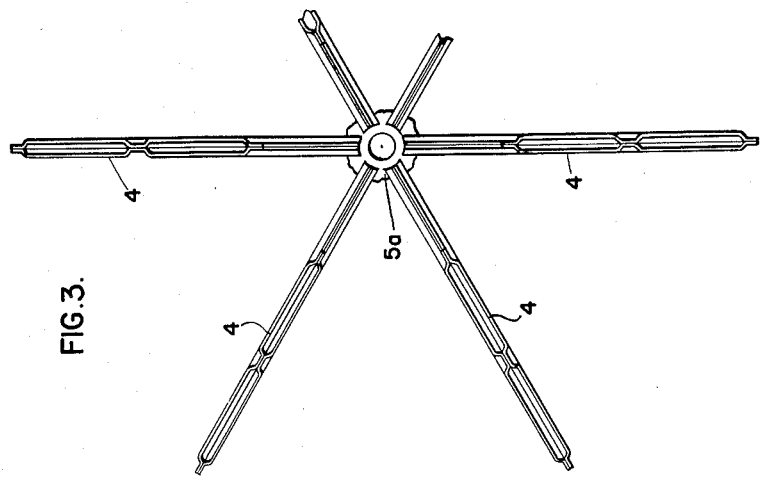
Figure 2:
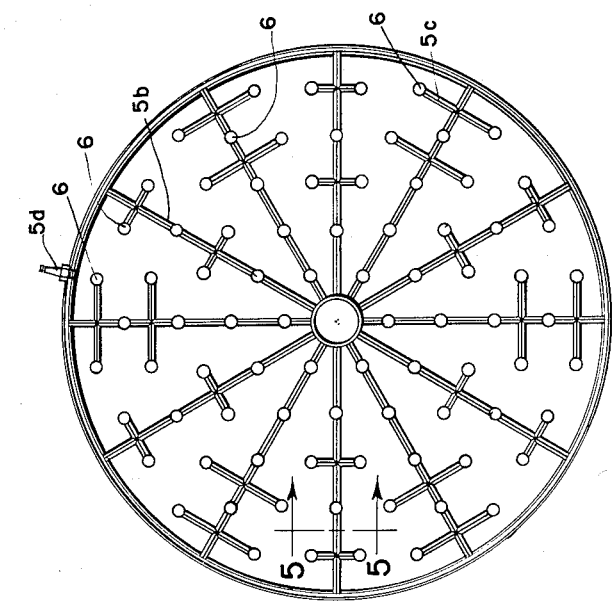

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, forming a part of this application in which:

Figure 1 is a side elevational view of my reheater for jet-propulsion engines showing portions broken away and in section to amplify the illustration and further showing diagrammatically the flow of fuel therethrough together with fuel supply and control means diagrammatically illustrated; Fig. 2 is a transverse sectional view taken from the line 2—2 of Fig. 1; Fig. 3 is an enlarged transverse sectional view taken from the line 3—3 of Fig. 1; Fig. 4 is an enlarged fragmentary rear-end view of my reheater showing by dash line varying positions of the out-let shutters thereof; Fig. 5 is an enlarged sectional view taken from the line 5—5 of Fig. 2; and Fig. 6 is a sectional view taken from the line 6—6 of Fig. 5;

Similar characters of reference refer to similar parts and portions throughout the several views of the drawings.

The diffuser 1, turbine hub fairing 2, casing 3, vaporizer conductors 4, manifold 5, nozzles 6, shutters 7, actuators 8, fuel pump 9, temperature sampling bulb 10, pump motor 11, and the valve 12 constitute the principal parts and portions of my reheater for jet-propulsion engines.

The diffuser 1 is a hollow cylindrical casing diverging from the front end to the rear end thereof, as shown best in Fig. 1 of the drawings. The front end of this diffuser 1 is provided with a flange 1a arranged to be connected with a conventional turbo jet-engine in place of the conventional converging exhaust cone thereof. The rear portion of the diffuser is provided with a spheroid joint portion 1b fitted in and conforming to the spheroid joint portion 3a of the casing 3 which provides for freedom of vibration of the parts, reducing to a minimum fatigue failure of the exhaust stack and reheater vaporizer structure. The turbine hub fairing 2 as shown in Fig. 1 of the drawings extends backwardly in converging relationship internally of the diffuser 1, and terminates at the hub portion 5a of the manifold 5. The casing 3 is a hollow casing provided with a straight cylindrical portion 3b and a conical portion 3c terminating in an exhaust opening 3d at the end, thereof. As shown in Fig. 1 of the drawings this casing 3 is provided with an inner wall 3e and an outer wall 3f in closely spaced relationship therewith, intermediate which helical baffles 3g are positioned. The outer casing portion 3f is provided with an inlet opening 3h arranged to conduct liquid fuel into the space intermediate the inner and outer walls 3e and 3f. The helical baffles 3g are preferably multiple lead helical members terminating at the transition between the straight cylindrical portion 3b and the conical portion 3c of the casing 3. Rearwardly of the transition between the straight cylindrical portion 3b and the conical portion 3c of the casing 3, the radially disposed vaporizer conductors 4 communicate with the space intermediate the inner and outer walls 3e and 3f of the casing 3. These vaporizer conductors 4 extend forwardly into communicated relation with the interior of the hub 5a of the manifold 5. As shown in Fig. 3 of the drawings these vaporizer conductors 4 are relatively thin in cross-section offering a minimum amount of obstruction to gases flowing therearound. It will be here noted that the space relationship of the inner and outer wall 3e and 3f of the casing 3 is slightly exaggerated for the purpose of illustration and the actual operating structure incorporates a closer proportional relationship of the inner and outer walls 3e and 3f of the casing 3. The hub 5a of the manifold 5 is circular in cross-section as shown in Fig. 3 of the drawings, and communicates with a plurality of radially disposed conductors 5b having vaporizer nozzles 6 communicating therewith, and also provided with branch conductors 5c with which the nozzles 6 are connected in communicative relationship therewith. The disposition of the nozzle 6 in connection with the manifold 5 is best illustrated in Fig. 2 of the drawings wherein the spark plug 5d is exposed in adjacent relationship with the outermost nozzle 6 in connection with the manifold 5 for initiating combustion of fuel vaporized about said nozzle 6. Each of the nozzles 6 as shown in Figs. 5 and 6 of the drawings communicates with one of the radially disposed conductor portions 5b of the manifold 5 and is provided with a stem portion 6a having openings 6b therein, at the upstream side of the disk 6c whereby the fuel is mixed with the airstream at the periphery of the disk 6c. The rearmost portion of the outer casing portion 3f is provided with an expansion joint 3k all as shown best in Fig. 1 of the drawings. Pivotally connected with the rear end portion of the casing 3 on pins 7a are the shutters 7. These shutters 7 resemble eyelids in general shape and are actuated by electrically operated screw-jack actuators 8. As shown in Fig. 4 of the drawings the shutters 7 when in the dash-line position A partially enclose the outlet opening 3d of the casing 3, forming an elliptical outlet opening of considerably smaller cross-sectional area than the outlet opening 3d as shown by solid lines in Fig. 4 of the drawings. As shown diagrammatically in Fig. 1 of the drawings the fuel conductor tube 12a communicating with the shut off valve 12, communicates at its opposite end with the inlet conductor portions 3h of the casing 3, intermediate the inner and outer wall 3e and 3f thereof. Communicating with the opposite end of the valve 12 is the conductor 12b connected to the outlet of the pump 9, operated in connection with the pump motor 11 which is an electrical motor controlled by the temperature sampling bulb 10 in the diffuser 1 outwardly of the turbine hub fairing 2 all as shown best in Fig. 1 of the drawings.

The operation of my reheater for jet-propulsion engines is substantially as follows:

When the flange 1a is connected to the conventional turbo jet-engine, the exhaust gases, thereof, contain a large proportion of oxygen which is conducted rearwardly in the diffuser 1 toward the manifold 5 and the nozzle 6 in connection, therewith. Fuel is supplied by the fuel pump 9 to the conductors 12b and 12a into the space between the inner and outer walls 3e and 3f of the casing 3, wherein, the liquid fuel is heated and conducted helically, therein, to the rear end portions of the vaporizer conductors 4 which are relatively thin members arranged to conduct heat, therein. The fuel is heated intermediate the inner and outer walls 3e and 3f of the casing 3, and is also heated in the vaporizer conductors 4 which conduct the same to the hub 5a and the manifold 5 from which the fuel passes radially into the conductor portions 5b, thereof, to the upstream side of the nozzle 6 and outwardly to the opening 6b in the stem portion 6a of said nozzle 6, whereupon the fuel is mixed with the air-stream at the periphery of the disk 6c of the nozzle 6 which maintain flame at the downstream side, thereof, in combustion of the fuel delivered by the manifold 5. The heat of combustion in the casing 3 rearwardly of the nozzle disk 6c in connection with the manifold 5, heats the inner wall 3f and outer walls 3e of the casing 3 and the vaporizer conductors 4 for continued volatilization of the liquid fuel therein. The expansion joint 3k of the casing 3 permits elongation of the outer wall 3f in accordance with the expansion of the inner wall 3e of the outer wall 3f in accordance with the expansion of the inner wall 3e, rearwardly of the manifold 5. It will be here noted that when the combustion is taking place in the casing 3 that the shutters 7 assume the solid-line position as shown in Fig. 4 of the drawings to compensate in exhaust cross-sectional area for added flow caused by said combustion. When the shutters 7 assume the solid line position as shown in Fig. 4 of the drawings, the opening 3d at the outlet end of the casing 3 is unrestricted providing sufficient area to accommodate the products of combustion issuing from the turbo-jet engine forward of the manifold 5 together with the gas flow and products of combustion issuing from the flame rearwardly of the manifold 5. When the shutters 7 are in the dash-line position as shown in Fig. 4 of the drawings, the valve 12 is shut off preventing the flow of fuel through the manifold 5 rendering my reheater inoperative. The shutters 7 in the dash-line position as shown in Fig. 4 of the drawings restrict the opening 3d to properly accommodate the gas flow from the turbo jet-engine only forward of my reheater. When my reheater is operated simultaneously with the turbo jet-engine forwardly, thereof, the temperature sampling bulb 10 at the outlet side of the turbo jet-engine turbine wheel regulates the speed of the motor 11 operating the fuel pump 9, which supplies fuel to the manifold 5 of my reheater. Thus, the speed of the motor 11 is increased in accordance with a temperature drop at the outlet side of the turbo jet-engine turbine wheel and the speed of the motor 11 is decreased upon an increase of temperature at the outlet side of the turbo jet-engine turbine wheel as indicated by the temperature sampling bulb 10 which is secured at the inner side of the diffuser 1 at the outlet side of the turbo jet-engine turbine wheel all as shown best in Fig. 1 of the drawings. The temperature sampling bulb 10 is arranged in the turbine exhaust to control the reheater fuel flow as a function of turbine outlet temperature. With this arrangement as the reheat temperature is increased the turbine exhaust pressure and temperature will rise. This turbine exhaust temperature rise will be limited to the design temperature for the turbine and thus the turbo jet-engine will be automatically made to operate at its maximum rated out-put when my reheater is in operation. It will be here noted that a large proportion of the gas flow from the turbo jet-engine is unused air containing an ample supply of oxygen for operation of my reheater in the combustion of fuel, therein, rearwardly of the turbo jet-engine. Increased combustion rearwardly of the jet-engine increases the temperature of the gas flow correspondingly increasing the velocity, thereof, which directly increases thrust of the gas flow passing outwardly of the opening 3d at the outlet end of the casing 3.

Though, I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a reheater for jet-propulsion engines of the class described, the combination of a diffuser adapted to be secured at the outlet side of the turbine wheel of a turbo jet-engine, a manifold rearwardly of said diffuser having a plurality of fuel nozzles in communicative relation therewith, a casing surrounding said manifold having inner and outer spaced and sealed walls having liquid fuel in contiguous contact therewith and therebetween, said manifold communicating with the space between said spaced walls, fuel inlet means communicating with the space intermediate said spaced wall at the forward end thereof, and a plurality of radially disposed vaporizer conductors connected with said inner wall of said casing and communicating with the space intermediate said space walls at the rear portions thereof and extending forwardly internally of said casing and connected with said manifold and communicating with the central portion thereof, said manifold having radially disposed conductor portions with which said nozzles communicate, said nozzles being distributed transversely of and within said casing, and helical partitions intermediate said spaced walls leading from the front end thereof towards the rear end thereof.

2. In a reheater for jet-propulsion engines of the class described, the combination of a diverging diffuser section adapted to be secured to the outlet side of the turbine wheel of a conventional turbo jet-engine, a fuel manifold near the diverging end of said diffuser, a fuel pump having a variable speed motor in connection therewith and arranged to supply fuel to said manifold, a temperature sampling bulb in said diffuser arranged to control the speed of said motor whereby said fuel pump increases the delivery of fuel to said manifold when the temperature in said diffuser drops and decreases the delivery of fuel to said manifold when the temperature in said diffuser rises as indicated by said temperature sampling bulb, and nozzles in connection with said manifold having disk shape portions and integral hollow stem portions provided with outlet openings at the upstream side of said disk shape portions.

3. In a reheater for jet-propulsion engines of the class described, the combination of a diverging diffuser section adapted to be secured to the outlet side of the turbine wheel of a conventional turbo jet-engine, a fuel manifold near the diverging end of said diffuser, a fuel pump having a variable speed motor in connection therewith, arranged to supply fuel to said manifold, and a temperature sampling bulb in said diffuser arranged to control the speed of said motor whereby said fuel pump increases the delivery of fuel to said manifold when the temperature in said diffuser drops and decreases the delivery of fuel to said manifold when the temperature in said diffuser rises as indicated by said temperature sampling bulb, nozzles in connection with said manifold and having disk shape portions and integral hollow stem portions provided with outlet openings at the upstream side of disk shape portions, a double walled casing surrounding said manifold, said fuel pump adapted to deliver raw fuel between the double walls of said casing, and means for conducting said fuel from the space between double walls of said casing to said manifold.

4. In a reheater for jet-propulsion engines of the class described, the combination of a diverging diffuser section adapted to be secured to the outlet side of the turbine wheel of a conventional turbo jet-engine, a fuel manifold near the diverging end of said diffuser, a fuel pump having a variable speed motor in connection therewith, arranged to supply fuel to said manifold, and a temperature sampling bulb in said diffuser arranged to control the speed of said motor whereby said fuel pump increases the delivery of fuel to said manifold when the temperature in said diffuser drops and decreases the delivery of fuel to said manifold when the temperature in said diffuser rises as indicated by said temperature sampling bulb, nozzles in connection with said manifold, baffles attached to said nozzles, a double walled casing surrounding said manifold, said fuel pump being adapted to deliver raw fuel between the double walls of said casing, and means for conducting said fuel from the space between said double walls to said manifold.

References Cited in the file of this patent

UNITED STATES PATENTS

| | | |
|---|---|---|
| 1,405,482 | Bostedo | Feb. 7, 1922 |
| 1,572,812 | Rees | Feb. 9, 1926 |
| 1,642,752 | Landon | Sept. 20, 1927 |
| 1,655,742 | Scott | Jan. 10, 1928 |
| 1,708,918 | Good | Apr. 9, 1929 |
| 1,830,159 | Doen | Nov. 3, 1931 |
| 1,932,740 | Kerr | Oct. 31, 1933 |
| 2,078,958 | Lysholm | May 4, 1937 |
| 2,091,998 | Lysholm | Sept. 7, 1937 |
| 2,131,781 | Lysholm | Oct. 4, 1938 |
| 2,353,929 | Ray | July 18, 1944 |
| 2,408,099 | Sherman | Sept. 24, 1946 |
| 2,479,776 | Price | Aug. 23, 1949 |
| 2,501,633 | Price | Mar. 21, 1950 |
| 2,520,751 | Zucrow | Aug. 29, 1950 |
| 2,566,373 | Redding | Sept. 4, 1951 |

FOREIGN PATENTS

| | | |
|---|---|---|
| 171,600 | Great Britain | Nov. 24, 1921 |